US010380366B2

(12) United States Patent
Bernau et al.

(10) Patent No.: US 10,380,366 B2
(45) Date of Patent: Aug. 13, 2019

(54) TRACKING PRIVACY BUDGET WITH DISTRIBUTED LEDGER

(71) Applicant: SAP SE, Walldorf (DE)

(72) Inventors: Daniel Bernau, Karlsruhe (DE); Florian Hahn, Karlsruhe (DE); Jonas Boehler, Karlsruhe (DE)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 15/496,403

(22) Filed: Apr. 25, 2017

(65) Prior Publication Data

US 2018/0307854 A1 Oct. 25, 2018

(51) Int. Cl.
*G06F 21/00* (2013.01)
*G06F 21/62* (2013.01)
*G06N 3/08* (2006.01)
*G06Q 40/00* (2012.01)

(52) U.S. Cl.
CPC .......... *G06F 21/6218* (2013.01); *G06N 3/08* (2013.01); *G06Q 40/12* (2013.12)

(58) Field of Classification Search
CPC ....... G06F 21/6218; G06Q 40/12; G06N 3/08
See application file for complete search history.

(56) References Cited

U.S. PATENT DOCUMENTS

| | | | | |
|---|---|---|---|---|
| 7,363,192 B2* | 4/2008 | Dwork | ............... | G06F 16/2458 702/180 |
| 7,698,250 B2* | 4/2010 | Dwork | ............... | G06F 16/2455 707/687 |
| 7,933,923 B2* | 4/2011 | Ben-Natan | .......... | G06F 16/2358 707/781 |
| 8,312,273 B2* | 11/2012 | Nice | ...................... | G06Q 30/02 713/150 |
| 8,375,030 B2* | 2/2013 | Rane | ................... | G06F 21/6245 707/736 |
| 8,555,400 B2* | 10/2013 | Shi | ........................ | H04L 9/3006 726/26 |
| 8,639,649 B2* | 1/2014 | McSherry | ................ | G06N 5/04 706/52 |
| 8,661,047 B2* | 2/2014 | Talwar | .................. | G06F 16/245 707/757 |
| 8,880,867 B2* | 11/2014 | Jawurek | .................. | H04L 9/008 380/255 |
| 8,893,292 B2* | 11/2014 | Wang | ................... | G06F 21/6254 726/26 |

(Continued)

*Primary Examiner* — David Garcia Cervetti
(74) *Attorney, Agent, or Firm* — Schwegman Lundberg & Woessner, P.A.

(57) ABSTRACT

Systems and methods are provided for sending a request to register a data offer from a data owner to participate in a distributed ledger, the request including information associated with the data offer and a privacy budget for the data offer, and wherein the information associated with the data offer and the privacy budget is stored in the distributed ledger and the data offer is accessible by third parties to the data owner. The systems and method further providing for receiving a request, associated with a third party computer, to access data associated with the data offer, processing a data request associated with the request to access data, based on determining that there is sufficient privacy budget to allow access to the data associated with the request to access data, to produce result data, anonymizing the result data, and updating the distributed ledger.

20 Claims, 7 Drawing Sheets

(56) References Cited

U.S. PATENT DOCUMENTS

| | | | | |
|---|---|---|---|---|
| 9,043,250 B2* | 5/2015 | Ling | G06N 5/022 | |
| | | | 706/12 | |
| 9,444,797 B2* | 9/2016 | Kurabayashi | G06F 16/24578 | |
| 9,646,104 B1* | 5/2017 | Canavor | G06F 16/9577 | |
| 9,737,258 B2* | 8/2017 | Poon | A61B 5/02405 | |
| 10,108,818 B2* | 10/2018 | Curcio | G06F 21/6263 | |
| 10,146,958 B2* | 12/2018 | Wang | G06F 21/6254 | |
| 10,223,547 B2* | 3/2019 | Rane | G06F 21/6245 | |
| 2007/0143289 A1* | 6/2007 | Dwork | G06F 16/2455 | |
| 2009/0182797 A1* | 7/2009 | Dwork | G06F 16/2465 | |
| | | | 708/403 | |
| 2010/0318546 A1* | 12/2010 | Kenthapadi | G06F 16/9535 | |
| | | | 707/759 | |
| 2011/0064221 A1* | 3/2011 | McSherry | H04K 1/02 | |
| | | | 380/252 | |
| 2011/0238611 A1* | 9/2011 | McSherry | G06N 5/04 | |
| | | | 706/52 | |
| 2012/0143922 A1* | 6/2012 | Rane | G06F 21/6245 | |
| | | | 707/803 | |
| 2012/0158589 A1* | 6/2012 | Katzin | G06Q 20/12 | |
| | | | 705/44 | |
| 2012/0204026 A1* | 8/2012 | Shi | H04L 9/3006 | |
| | | | 713/155 | |
| 2012/0296898 A1* | 11/2012 | Cormode | G06F 16/2457 | |
| | | | 707/736 | |
| 2012/0316992 A1* | 12/2012 | Oborne | G06Q 30/06 | |
| | | | 705/26.41 | |
| 2013/0145473 A1* | 6/2013 | Cormode | G06F 21/10 | |
| | | | 726/26 | |
| 2013/0275743 A1* | 10/2013 | Jawurek | H04L 9/008 | |
| | | | 713/150 | |
| 2013/0346302 A1* | 12/2013 | Purves | G06Q 20/102 | |
| | | | 705/40 | |
| 2014/0040172 A1* | 2/2014 | Ling | G06N 5/022 | |
| | | | 706/12 | |
| 2014/0101053 A1* | 4/2014 | Danezis | G06Q 50/06 | |
| | | | 705/63 | |
| 2014/0137260 A1* | 5/2014 | Wang | G06F 21/6254 | |
| | | | 726/26 | |
| 2014/0196151 A1* | 7/2014 | Mishra | G06F 16/258 | |
| | | | 726/26 | |
| 2014/0281572 A1* | 9/2014 | Wang | G06F 21/6254 | |
| | | | 713/189 | |
| 2015/0286827 A1* | 10/2015 | Fawaz | H04L 9/00 | |
| | | | 726/26 | |
| 2015/0347624 A1* | 12/2015 | Villars | G06F 16/9024 | |
| | | | 705/7.29 | |
| 2016/0071170 A1* | 3/2016 | Massoulie | G06Q 30/0282 | |
| | | | 705/26.7 | |
| 2016/0192185 A1* | 6/2016 | Henry | H04W 12/02 | |
| | | | 455/411 | |
| 2016/0300252 A1* | 10/2016 | Frank | G06Q 30/0203 | |
| 2016/0335455 A1* | 11/2016 | Mohan | G06F 16/90335 | |
| 2016/0350481 A1* | 12/2016 | Wesemann | G06F 19/324 | |
| 2017/0109544 A1* | 4/2017 | Chen | G06F 21/6254 | |
| 2017/0169253 A1* | 6/2017 | Curcio | G06F 21/6263 | |
| 2017/0310483 A1* | 10/2017 | Nagao | H04L 9/3247 | |
| 2018/0004978 A1* | 1/2018 | Hebert | G06F 16/2457 | |
| 2018/0096175 A1* | 4/2018 | Schmeling | B29C 64/10 | |
| 2018/0101697 A1* | 4/2018 | Rane | G06F 21/6245 | |
| 2018/0114594 A1* | 4/2018 | Bessette | G06Q 50/24 | |
| 2018/0121817 A1* | 5/2018 | Datta | G06N 5/046 | |
| 2018/0130050 A1* | 5/2018 | Taylor | G06Q 20/3674 | |
| 2018/0144378 A1* | 5/2018 | Perez | G06Q 30/06 | |
| 2018/0150647 A1* | 5/2018 | Naqvi | H04L 9/321 | |
| 2018/0198602 A1* | 7/2018 | Duffy | G06F 17/218 | |
| 2018/0219836 A1* | 8/2018 | Peterson | H04L 63/04 | |
| 2018/0239925 A1* | 8/2018 | Nerurkar | G06F 21/6254 | |
| 2018/0268306 A1* | 9/2018 | Laine | G06K 9/6261 | |
| 2018/0349384 A1* | 12/2018 | Nerurkar | G06F 21/6245 | |

* cited by examiner

US 10,380,366 B2

TRACKING PRIVACY BUDGET WITH DISTRIBUTED LEDGER

BACKGROUND

With the rise of data driven application scenarios, such as machine learning, there is an opportunity to enable sharing of master data (e.g., as training data). While access to data in general has improved, data sharing is still not a seamless activity and is, for example, a major barrier for value capturing in areas such as the U.S. healthcare market. Moreover, there are risks when sharing data because data may reveal insights into a company's business model or sensitive information about individuals. Furthermore, there are ethical considerations in regards to the decisions of machine learning approaches like neural networks (e.g., what influence the data of an individual may have in the training data). Research has shown that these risks also hold when data is anonymized with improper suppression methods by re-identification attacks.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein provide a distributed architecture to optimize an interactive model in differential privacy from a three party to a two party model by utilizing distributed ledger technology. This distributed architecture provides for an anonymization technique to address threats, such as re-identification threats, and realizes a transparent market for sharing anonymized data. Involved parties may remain sovereigns of their own data while being enabled by example embodiments to participate in a distributed data-as-a-service business model.

For example, data owners may register one or more data offers to participate in a distributed ledger. The one or more data offers and associated privacy budgets are stored in the data ledger and the one or more data offers are accessible by third parties to each data owner. Each data owner may access or receive requests from one or more third parties to access data associated with the one or more data offers. The data owner analyzes the privacy budget for the data offer to determine if there is sufficient privacy budget to allow access to the data associated with the request to access data. The data owner processes a data request associated with the request to access data, based on determining that there is sufficient privacy budget to allow access to the data associated with the request to access data, to produce result data. The data owner anonymizes the result data, updates the balance for the privacy budget in the distributed ledger, and provides the anonymized result data to the third party.

Figure 1:
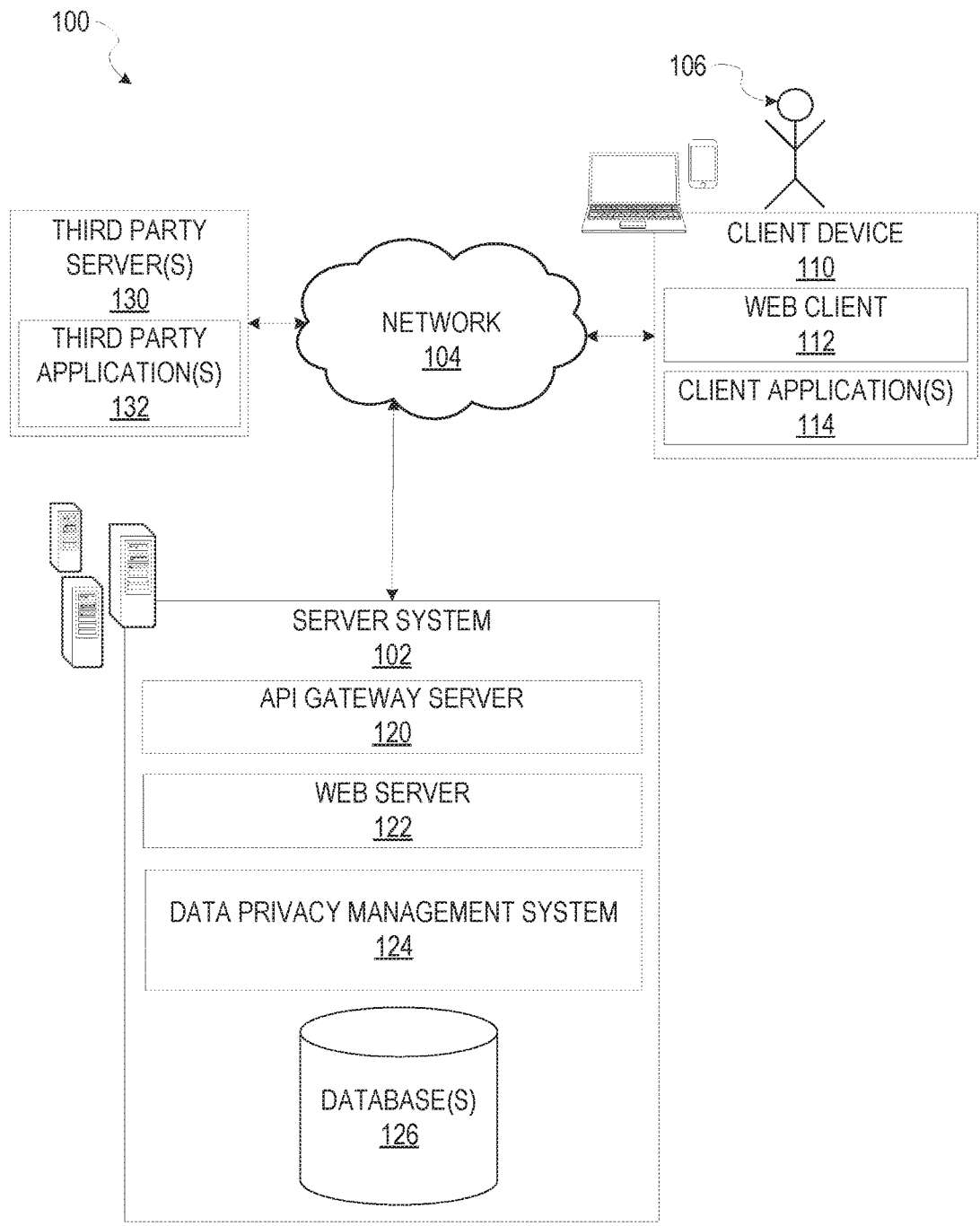
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request and receive information via a digital assistant, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alpha-numeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a digital assistant application, and the like.

In some embodiments, one or more client applications 114 may be included in a given one of the client device 110 and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access enterprise resource planning (ERP) or customer relationship management (CRM) data, to request data, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) gateway server 120, a web server 122, and data privacy management system 124, that may be communicatively coupled with one or more databases 126 or other form of data stores.

The one or more databases 126 may be one or more storage devices that store data related to an enterprise system, user data, and other data. The one or more databases 126 may further store information related to third party servers 130, third party applications 132, client devices 110, client applications 114, users 106, and so forth. The one or more databases 126 may include cloud-based storage in some embodiments. The one or more databases 126 may comprise a distribute ledger as describe in further detail below.

The server system 102 may be a cloud computing environment, according to some example embodiments. The server system 102, and any servers associated with the server system 102, may be associated with a cloud-based application, in one example embodiment.

The data privacy management system 124 may manage resources and provide back-end support for third party servers 130, third party applications 132, client applications 114, and so forth, which may include cloud-based applications. The data privacy management system 124 may provide functionality for a distributed ledger, data privacy functionality, and so forth.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide various functionality that is supported by relevant functionality and data in the server system 102.

The one or more third party server(s) 130 may be associated with a data owner and may access original or master data stored in one or more databases or other data stores (not shown) associated with the data owner and third party server(s) 130. The one or more third party server(s) 130 may be associated with data requester or buyer.

As explained above, example embodiments provide a distributed architecture to optimize an interactive model in differential privacy. Differential privacy provides a mathematical provable guarantee that the presence (or absence) of an individual in a database has a multiplicative impact the likelihood of obtaining a specific function result on a database by max $\exp(\epsilon)$. A function is, for example, represented by an SQL query (e.g., count). The guarantee is realized by adding random noise sampled from a distribution tailored to hide the possible maximum impact an individual can have on a function $f$, called sensitivity or $\Delta f$. Differential privacy, in contrast to, for example, k-anonymity, is thus offering functional protection instead of syntactical protection. The functional protection can be enforced by either adding noise to the result of a function that is evaluated on the original data (e.g., interactive model) or by adding noise directly to the original data and evaluating functions only on the resulting sanitized data afterwards (e.g., non-interactive model). While the non-interactive model only requires tracking E once when sanitizing the original data, the interactive model requires tracking E continuously for every evaluated function. This accumulative $\epsilon$ tracking is referred to as the privacy budget. The privacy budget is expected to be tracked by a trusted third party, called a privacy accountant or data curator. The curator's responsibility thereby lies in two tasks. A first task is maintaining a log to which tuples of the pair (attribute, epsilon) are being added. A second task is monitoring whether the sum over all epsilons for a given attribute is smaller than the privacy budget negotiated for this attribute with the data owner.

Example embodiments model a database or data set as a collection of records from a universe D. The Hamming distance $d_H(\bullet, \bullet)$ between two databases x, y∈D" is $d_H(x, y) = |\{i: x_i \neq y_i\}|$, e.g., the number of entries in which they differ. Databases x, y are called neighbors or neighboring if $d_H(x, y) = 1$.

Definition 1 (Differential Privacy). A perturbation mechanism M provides $\epsilon$-differential privacy if for all neighboring data sets $D_1$ and $D_2$, and all S⊆Range (M), $$\Pr[M(D_1) \in S] \leq \exp(\epsilon) \times \Pr[M(D_2) \in S].$$

The party providing input for M is referred to as the data owner herein. The protection for an individual participating in the data set is measured by the privacy level $\epsilon$. While a small $\epsilon$ offers higher protection for individuals involved in the computation of a statistical function $f$, a larger $\epsilon$ offers higher accuracy on the statistical function. While there is no specific bound on the value of $\epsilon$, for purposes of example the value will be chosen in the interval from 0.01 to 1, depending on mutual agreement.

In the case where an individual is involved in a series of statistical functions perturbed by a corresponding mechanism $M_i$, where each function is requiring $\epsilon_i$, her protection is defined as the sum over all $\epsilon_i$ by a basic sequential composition theorem, or by more advanced composition theorems. More formally with a database X, the following may apply:

Theorem 2 (Sequential Composition Theorem). Let $M_i$ each provide $\epsilon_i$-differential privacy. The sequence of $M_i(X)$ provides $(\Sigma_i \epsilon_i)$-differential privacy.

The parallel composition theorem applies when the input domain is divided into disjoint subsets $D_i$. If each $M_i$ provides $\epsilon$-differential privacy, then the sequence of $M_i(X \cap D_i)$ provides $\epsilon$-differential privacy.

A data owner can limit the amount of incremental queries (e.g., possibly many not very precise query results), or utilized precision (e.g., possibly few but more precise results), by specifying a quantitative upper bound on $\epsilon$, called a privacy budget. Depending on the mutual agreement, the exhaustion of the privacy budget can require the original data to be destroyed, since the privacy guarantee no longer holds.

Two models for differential privacy have been suggested. In the interactive model, a data analyst is allowed to evaluate a function $f$ on an unperturbed data set D and will, as long as the privacy budget is sufficient, receive noisy answers. Here, the choice of f is flexible, and we calculate the result of M as $r=f(D)+n(D,f)$ with a noise function n. In contrast, it is possible to discard the original data set D in the non-interactive model by producing a sanitized version $D'=M(D,f)$ of D (or a subset of it) for only a specific set of functions alone. All results are then calculated over the sanitized database, e.g., $r=f(D')$. Due to the latter aspect, $D'$ may be inefficient but potentially useful for many classes of queries if computational constraints are ignored. The majority of mechanisms may utilize the interactive model and thus, the interactive model will be used in example embodiments. However, the reliance on a trusted third party in this model is removed.

The distributed ledger technology (DLT) is a consensus shared, distributed digital data without the need for one central data administrator. More particularly, it is assumed that n parties $\{P_1, \ldots, P_n\}$ are participating in the distributed network, where some of these parties may be malicious or faulty. Each party $P_i$ holds (possible empty) input transactions $x_i$. After a successful execution of the distributed consensus protocol, the following properties may hold:

Consensus: All input transactions by honest parties are stored in one resulting ledger state.

Transparency: All honest parties can access this distributed ledger and see the same state.

Authenticity: Each input transaction $x_i$ is authenticated by the corresponding party $P_i$.

Immutability: Input transactions that are stored in the ledger state cannot be altered (either by the origin party or any other party). Only new transactions can be appended.

In one example, the blockchain technology is a possible implementation for the DLT, and the blockchain technology is discussed in example embodiments. It is understood, however, that other public ledger technologies may be used instead of the blockchain technology or in addition to the blockchain technology.

One example is a data-as-a-service business model in which potentially many participants are enabled to offer anonymized data at market prices determined through the economic model of demand and supply. For this, indeed, transparency and trust is required. These are properties achieved through the integration of differential privacy and blockchain in the architecture defined below. The example business model is intended for, but not limited to, sharing enterprise data (e.g., enterprise resource planning (ERP), customer relationship management (CRM), supply chain management (SCM), from systems such as an SAP system) for machine learning and enterprise benchmarking. An example for this business model is provided by illustrating an enterprise insurance benchmarking scenario.

In the enterprise insurance benchmarking scenario, participants of an economic sector share data to gain insights into their efficiency (e.g., by comparing well defined key performance indicators (KPIs)). This scenario may be realized through the architecture described herein while enforcing privacy guarantees and avoiding the need for an intermediary.

For example, there may be two parties, insurance company A and insurance company B. Insurance company A is running SAP ERP Central Component (ECC) for insurance and wants to externalize information about the size of payments for specific insurance claims. This data should be anonymized since this data may lead to data protection issues related to customers and since this data may allow insights into insurance company A's performance. Thus, insurance company A posts an offer to the DLT through a communication component in SAP HANA. In one example, the offer may be in the form {HashID, Incident_Type, Payment, $\epsilon=1$}.

Insurance company B may like to judge its performance and thus it may check the DLT for data offers. Insurance company B does not necessarily need to run SAP HANA: it may run a different system. Insurance company B will be able to view and access insurance company A's offering and contact insurance company A's communication component with a bid. If insurance company A accepts the bid, the data will be anonymized via the privacy component, the DLT entry updated, and data sent to insurance company B via the communication component.

Figure 2:
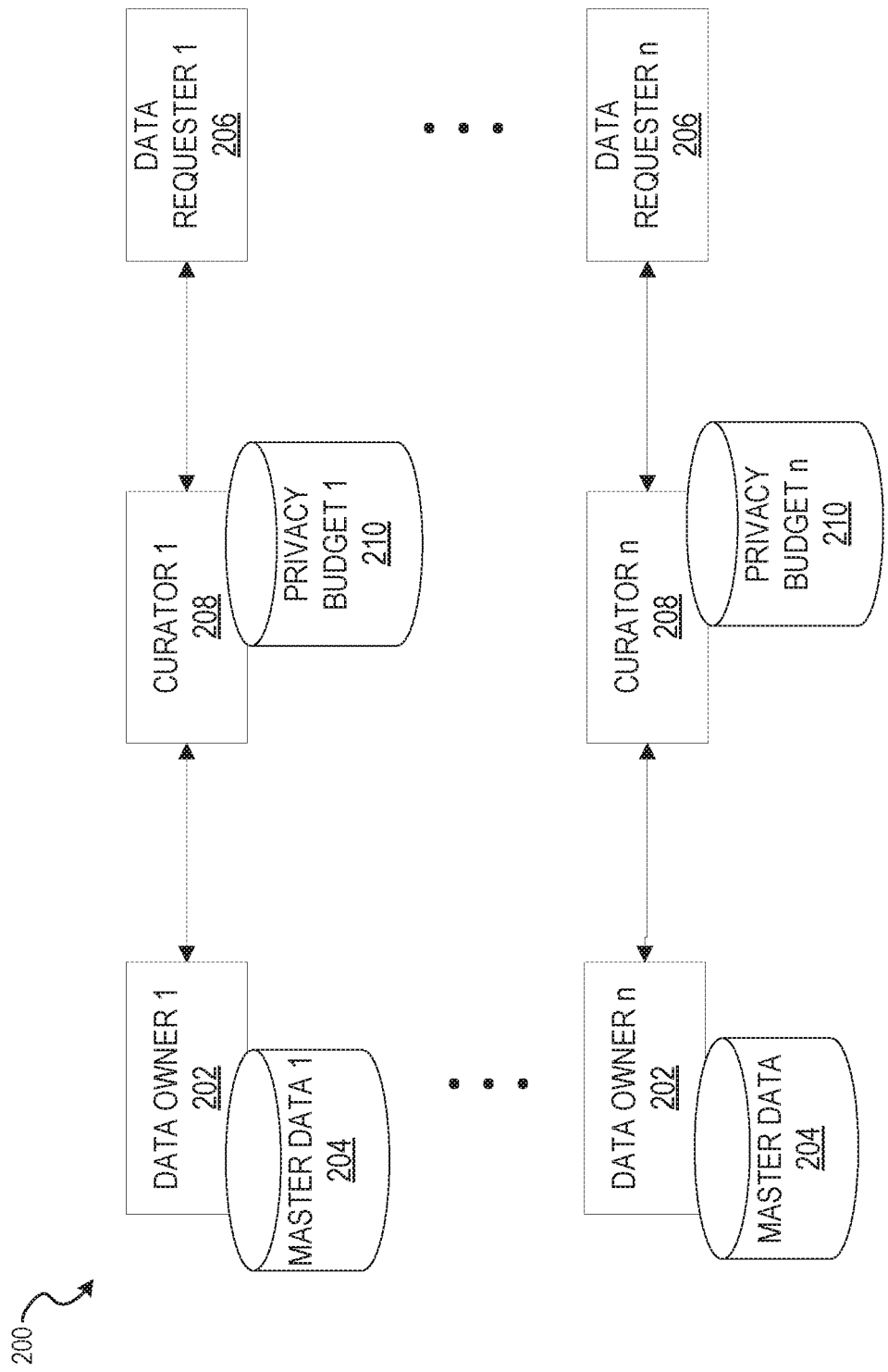
FIG. 2 is a diagram illustrating a decentralized architecture, according to some example embodiments.

In the case of interactive differential privacy, a trusted third party is needed to administer the anonymization of data and keep track of the consumed privacy budget by each data analyst. This third party, often referred to as a curator or administrator, can be removed using blockchain technology. That is, each query is received, processed, and sanitized by the data owner. FIG. 2 illustrates a decentralized architecture 200 with curators 208 as trusted third parties with each having an associated privacy budget 210. The architecture in FIG. 2 comprises multiple instantiations of data owners 202 who offer data 204, multiple instantiations of curators 208 who guarantee $\epsilon$ for the anonymization, and multiple instantiations of data requesters 206 (also referred to as data analysts or data buyers) who request data.

Figure 3:
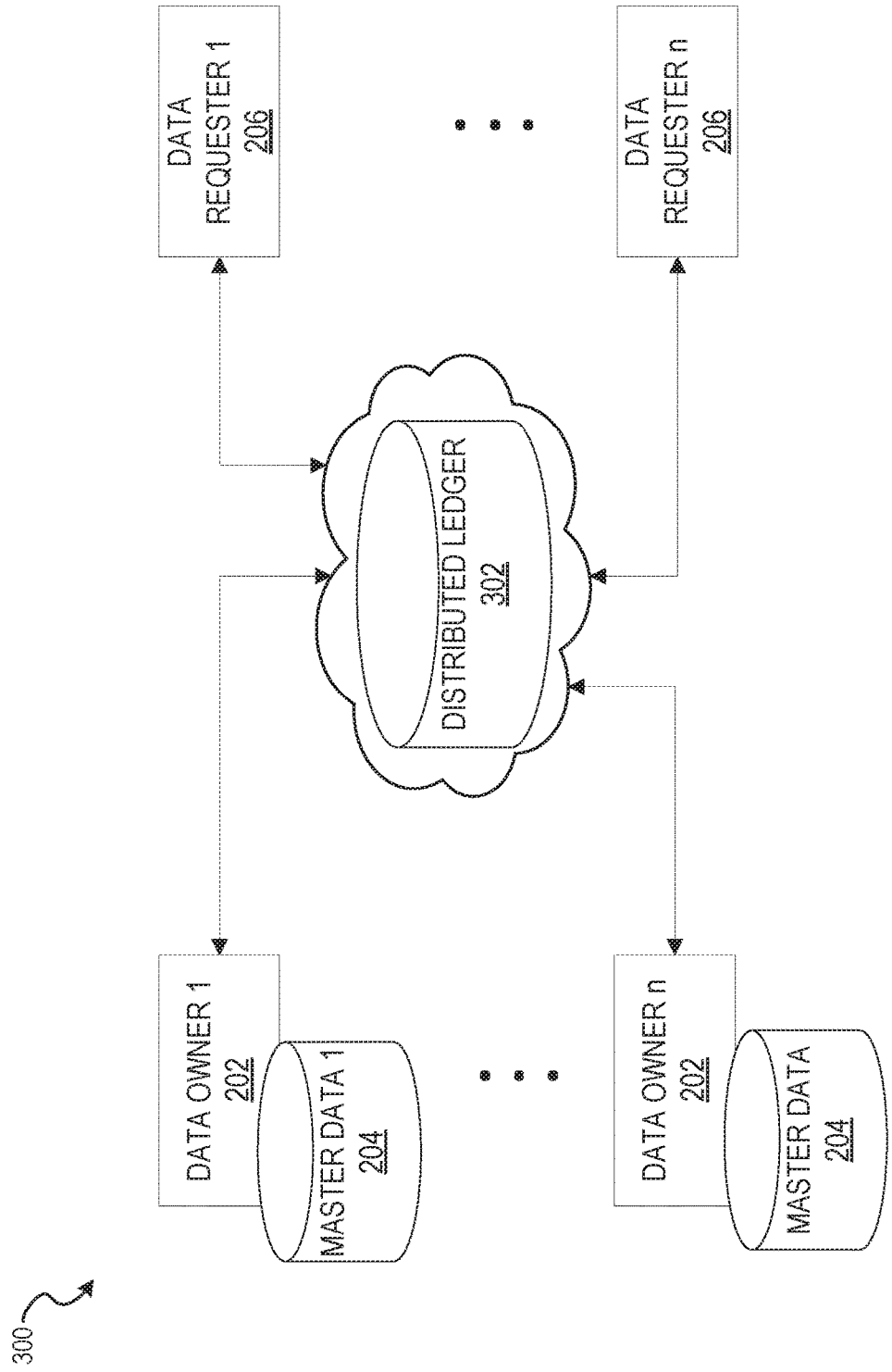
FIG. 3 is a diagram illustrating a centralized architecture, according to some example embodiments.

By placing the anonymization at a trusted component at the data owner and replacing the instances of curators by the DLT, example embodiments provide transparency about overall demand and supply for data owners and also data analysts. The data owner can define an offering by specifying master data and epsilon. This offering is published within the distributed ledger realized with blockchain. As a result, each participant of the network can track this agreement and hence learn about the additional information gained by the data analyst, and about the supply of certain data. FIG. 3 illustrates such a centralized architecture 300 for supplied privacy guarantee and demanded result accuracy. The architecture in FIG. 3 comprises multiple instantiations of data owners 202 who offer data 204, one distributed ledger 302 $\epsilon$ for the anonymization, and multiple instantiations of data requesters or analysts 206 who request data.

The distributed ledger 302 may be one or more data stores such as a database that is shared and synchronized across a network (e.g., network 104). In one example, the distributed ledger 302 is stored in distributed computer memory. One or more computers (e.g., server computers) may be associated with the distributed ledger 302.

Figure 4:
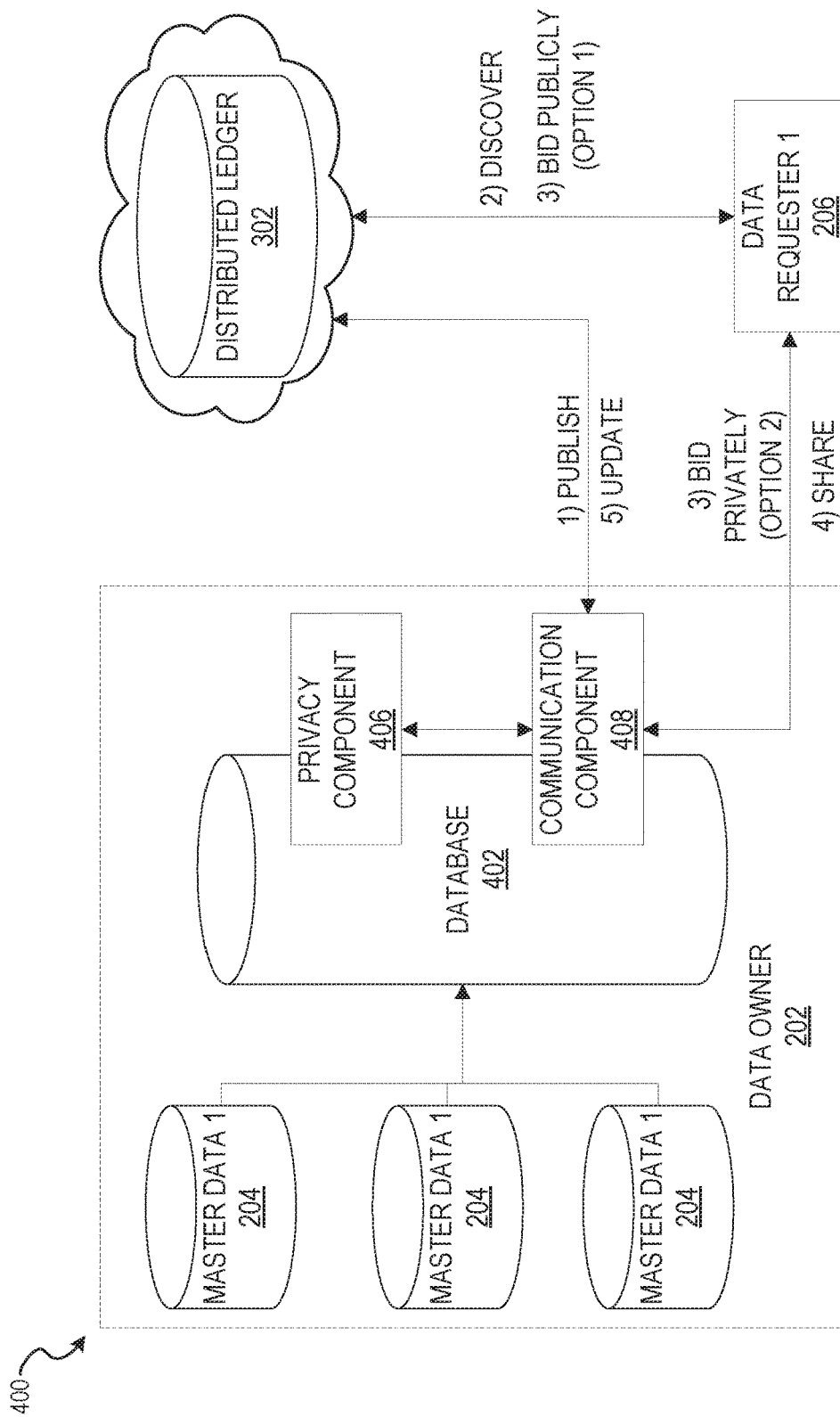
FIG. 4 is a diagram illustrating an architecture and data flow, according to some example embodiments.

In one example embodiment, anonymization of master data (e.g., from SAP systems instances (e.g., ERP, CRM, SCM) or other systems) may be provided by a library component (e.g., an SAP HANA library component, etc.) referred to herein as a privacy component. The privacy component is similar to a computer program library and contains anonymization functionalities, such as differential privacy algorithms. Furthermore, a communication component is provided to read from and write to the distributed ledger and communicate with potential data requesters or buyers. FIG. 4 illustrates an architecture and data flow 400 comprising these and other components.

FIG. 4 illustrates a data owner 202 and master data 204 associated with the data owner 202. The master data 204 may be stored in one or more data stores. There may be any number of data stores for the master data, the number of data stores shown in FIG. 4 are simply for illustration purposes. A database 402 may comprise all of the master data 204 associated with the data owner 202, or just a subset of the master data 204. The master data 204 may be sent to the database 402 and received and stored in the database 402. The database 402 may be local to the data owner 202 or may be (e.g., cloud-based) storage remote from the data owner 202. The data owner 202 may register to participate in the distributed ledger so that data offers associated with master data 202 may be made available to third parties to the data owner 202, as explained further below.

A communication component 408 provides functionality to perform tasks in respect to DLT activities. In one example, the DLT is a peer-to-peer (P2P) data structure. In this example, the communication component 408 is in charge of maintaining the full data structure duplicated at the communication component side or, alternatively, maintaining at least a portion of blocks for verification reasons. The communication component 408 provides functionality to perform various activities. One activity is appending the ledger of the DLT 302. For example, the communication component initially publishes data information, such as the data owner and the type of data, and the privacy budget ($\epsilon$) to the DLT 302 (e.g., step 1). In another example, the communication component updates the privacy budget in the DLT 302 (e.g., step 5).

Another activity of the communication component 408 is accepting requests such as public bids (e.g., requests to access data associated with data offers) via DLT 302 (e.g., step 3, option 1) or private bids (e.g., requests to access data associated with data offers) from the data requester 206 directly (e.g., step 3, option 2). And yet another activity is to share the anonymized data with the data requester 206 (e.g., step 4).

A privacy component 406 provides anonymization functionality. In one example, the privacy component 406 is a dedicated privacy component within SAP HANA. In one example, the privacy component is distributed as a compiled closed source package to ensure basic verifiability and protection against modifications (e.g., via hash sums). The privacy component 406 comprises differential privacy algorithms that may be used by specifying three input parameters: master data to be anonymized, global sensitivity $\Delta f$ of function $f$ to be evaluated, and privacy parameter $\epsilon$ for noise sampling.

The anonymization of master data may be performed via any differential privacy algorithm. For example, numerical master data is anonymized by adding noise sampled from a distribution to the values. Usually, the noise is sampled from the Laplace distribution with location $\mu=0$ and scale $b=\Delta f/\epsilon$; this is known as the Laplace mechanism. For non-numerical data, the Exponential mechanism can be applied, for location data, one can apply geo-indistinguishability, and so forth.

The distributed ledger 302 may be implemented using blockchain technology to remove the reliance on a trusted party. The distributed ledger 302 may comprise data owner information (e.g., identification information associated with the data owner), master data information, and so forth.

The data requester 206 or data buyer may be a system that: discovers what data is available by communicating with the distributed ledger 302 to access information at the distributed ledger 302 (e.g., step 2), may communicate with the distributed ledger 302 to request data or bid publicly for data (e.g., step 3, options 1), and may communicate with the communication component 408 to request data or bid privately (e.g., step 3, option 2) or to receive data (e.g., step 4).

Figure 5:
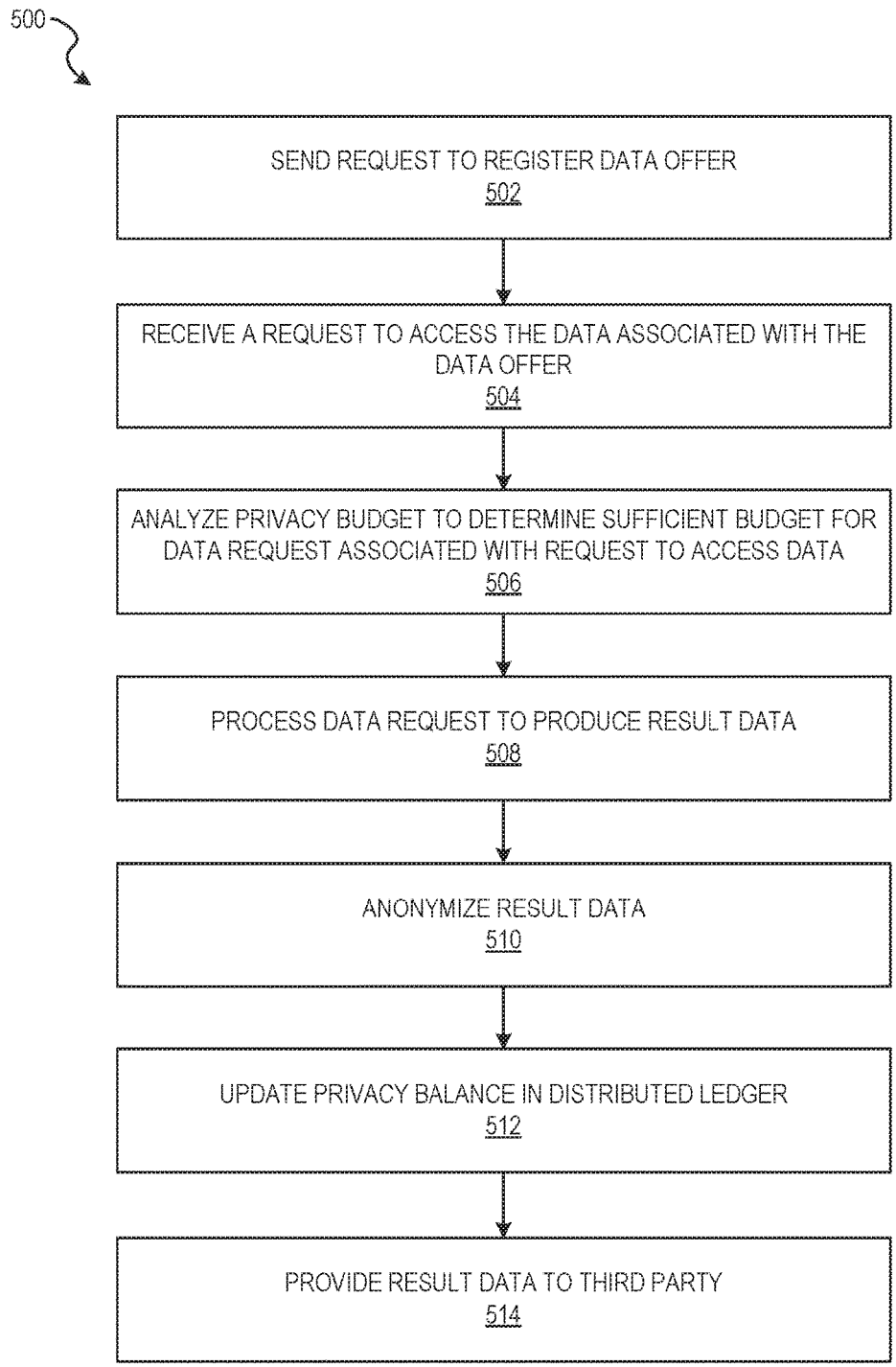
FIG. 5 is a flow chart illustrating aspects of a method, according to some example embodiments.

FIG. 5 is a flow chart illustrating aspects of a method 500, according to some example embodiments. For illustrative purposes, method 500 is described with respect to the networked system 100 of FIG. 1 and FIG. 4. It is to be understood that method 500 may be practiced with other system configurations in other embodiments.

In operation 502, a computing device (e.g., a client device 110 or a server computer) associated with a data owner 202 sends a request to register a data offer. For example, the data owner may have master data related to healthcare, such as patient demographics, diagnosis and treatments, insurance information, and so forth. The data owner may want to make some, part, all of this data accessible to third parties. Accordingly, the data owner registers to participate in a distributed ledger. In one example, the request to register a data offer is broadcast to all computing devices associated with or that are part of the distributed ledger 302.

The request to register a data offer may comprise information associated with the data offer and a privacy budget for the data offer. For example, the information associated with the data offer may include a description of the data associated with the data offer, identification information associated with the data owner (e.g., so that the data owner can be contacted to access data associated with the data offer), and so forth. The privacy budget may be determined by the data owner based on how sensitive the data is (e.g., how much data can be released), how accurate the data is, and so forth. For example, the higher the privacy budget, the less protection the data has and the more accurate and precise queries (e.g., data requests) may be. The lower the privacy budget, the more data protection and less accurate and precise queries may be.

The distributed ledger 302 (e.g., one or more computing devices, such as a server computer, associated with or that are a part of the distributed ledger 302) receives the request to register the data offer from the data owner 202.

The data offer is added to the distributed ledger. For example, the distributed ledger 302 stores the information associated with the data offer and the privacy budget for the data offer. The distributed ledger 302 makes the data offer accessible to third parties (e.g., data requester 206) of the data owner 202. The distributed ledger 302 may comprise data offers from other data owners not associated with the data owner 202 and/or other data offers associated with the data owner 202. In this way, the distributed ledger 302 provides a more transparent market for a third party (e.g., data buyer or data requester) to access (e.g., buy) data.

In one example, the distributed ledger 302 may send a response to the data owner 202 indicating that the data offer has been registered. In another example, since the distributed ledger 302 is a public, transparent, and decentralized data structure, the data owner may inspect the distributed ledger 302 itself and a response to the data owner is not necessary. In one example, the data owner 202 may complete registration by creating the necessary cryptographic keys (e.g., to be used for digital signatures to sign and update (e.g., data offer, request, privacy budget, etc.) the distributed ledger 302) and downloading the distributed consensus (e.g., data offer, or in the case of blockchain, the chain of all blocks that is protected by the proof of work and the assumption of an honest majority) data from the distributed ledger.

Once the data offer has been published to the distributed ledger, it is accessible to third parties. In operation 504, the computing device associated with the data owner 202 receives a request (e.g., via communication component 408)

from a third party data requester 206 to access data associated with the data offer. For example, the third party data requester 206 may be interested in patient demographics and insurance information and may send a bid to the data owner 202 to request access to data associated with the data offer, which may include patient demographics and insurance information. The third party may determine that the data associated with the data offer fits their use case according to a description of the data, determine the accuracy is adequate for the data analysis they need, and so forth.

The data owner 202 may receive the request directly, or may access the distributed ledger 302 to determine that a request is made from the third party data requester 206. The data owner 202 may receive multiple requests to access the data offer (or bids to access the data offer). For example, the data owner 202 may receive multiple requests and decide to accept or deny one or more requests based on various criteria (e.g., amount of bid, information associated with third party, particular data requests from the third party, etc.).

The request (or bid) to access the data associated with the data offer may comprise a privacy guarantee (e.g., noise value) $e' \leq \epsilon$ that the third party data requester 206 is willing to accept. The request to access the data associated with the data offer may comprise a function $f$ in which the third party is interested. For example, the function may be the actual query that the third party is interested in.

In operation 506, the computing device associated with the data owner 202 analyzes the privacy budget (e.g., via privacy component 406) for the data offer to determine if there is sufficient privacy budget to allow access to the data associated with the request to access data. For example, the computing device associated with the data owner 202 may determine a current balance of the privacy budget and how much privacy budget is necessary for a data request associated with the request to access data associated with the data offer. The computing device may compare the balance of the privacy budget to the privacy balance necessary to the data request. If there is sufficient privacy budget (e.g., the privacy balance necessary to the data request is less than or equal to the privacy budget), the computing device may accept the request or bid. If there is not sufficient privacy balance (e.g., the privacy balance necessary to the data request is greater than the privacy budget), the computing device may reject the request or bid. The data owner may also reject the request to access data based on other criteria.

If the data owner accepts the request to access data (e.g., based on determining that there is sufficient privacy budget to allow access to the data associated with the request to access data), the computing device processes at least one data request associated with the request to access data, to produce result data, in operation 508. For example, the computing device evaluates the function $f$ over the offered dataset.

In operation 510, the computing device anonymizes the result data. For example, the computing device adds noise (e.g., via a negotiated noise value $e'$) according to a differential privacy algorithm (e.g., different privacy definition 1 described above). In one example, anonymizing the result data comprises adding noise to the result data wherein the amount of noise added is according to the portion of the privacy budget that is available for the result data.

In operation 512, the computing device updates a distributed ledger entry in the distributed ledger 302 to update a balance for the privacy budget. In one example the privacy budget for the data offer is updated in the distributed ledger by the data owner according to theorem 2 described above.

In operation 514, the computing device (e.g., via communication component 408) provides the anonymized result data to the third party data requester 206. The data owner 202 may receive additional requests from one or more third party data requesters 206 to access the data associated with the data offer. For each request, the data owner 202 may analyze the privacy budget to determine if there is sufficient privacy budget to allow access to the data associated with the request to access data; process a data request associated with the request to access data, based on determining that there is sufficient privacy budget to allow access to the data associated with the request to access data, to produce result data; anonymize the result data; update a distributed ledger entry in the distributed ledger to update a balance for the privacy budget; and provide the anonymized result data to the third party, as described above, until there is no more privacy budget (or insufficient privacy budget for any actual query). Once the privacy budget is zero or insufficient for any further query, the data associated with the data offer can no longer be accessed. The data owner 202 may then cause the data offer to be marked as invalid or expired in the distributed ledger 302. In one example, a data offer may be marked as invalid or expired by updating the privacy budget to zero.

As explained above, the distributed ledger 302 may comprise data offers from other data owners not associated with the data owner and/or other data offers associated with the data owner. Each of these data owners may register data offers and receive and process offers, as described above.

As also explained above, the distributed ledger provides a more transparent market for a third party (e.g., data buyer) to access (e.g., buy) data. Moreover, once the privacy budget and/or any updates to the privacy budget are committed to the distributed ledger (e.g., written to the distributed ledger), the privacy budget cannot be changed afterward by other parties other than the data owner. Accordingly, a different privacy budget (e.g., $\epsilon$ value) cannot be faked.

Figure 6:
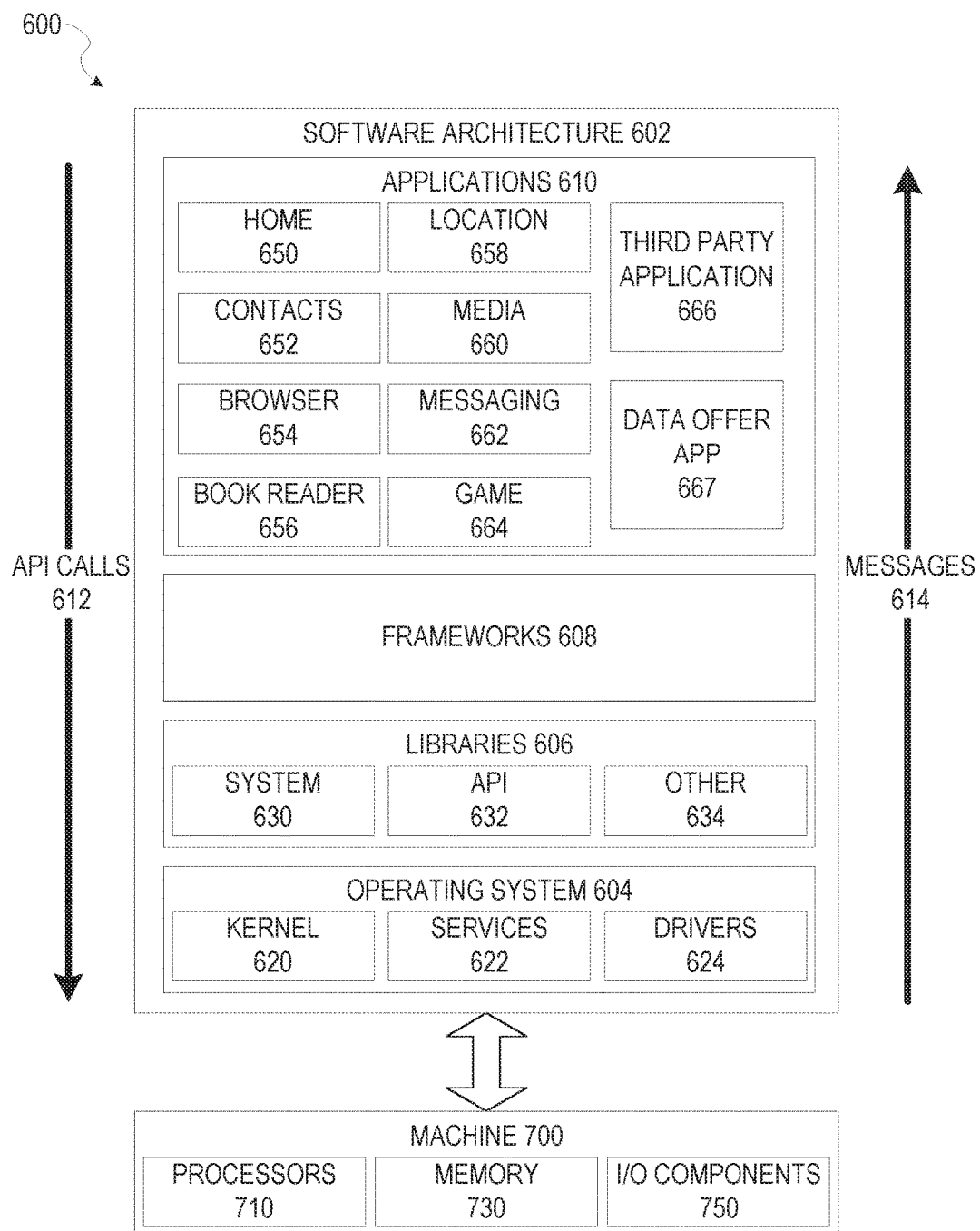
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and server systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third party applications 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 666 can invoke the API calls 612 provided by the operating system 604 to facilitate functionality described herein.

Some embodiments may particularly include a data offer application 667, which may be any application that requests data or other tasks to be performed by systems and servers described herein, such as server system 102, third party servers 130, and so forth. In certain embodiments, this may be a stand-alone application that operates to manage communications with a server system such as third party servers 130 or server system 102. In other embodiments, this functionality may be integrated with another application. The data offer application 667 may request and display various data related to data offers and may provide the capability for a user 106 to input data related to the system via voice, a touch interface, a keyboard, or using a camera device of machine 700, communication with a server system via I/O components 750, and receipt and storage of object data in memory 730. Presentation of information and user inputs associated with the information may be managed by task requesting application 667 using different frameworks 608, library 606 elements, or operating system 604 elements operating on a machine 700.

Figure 7:
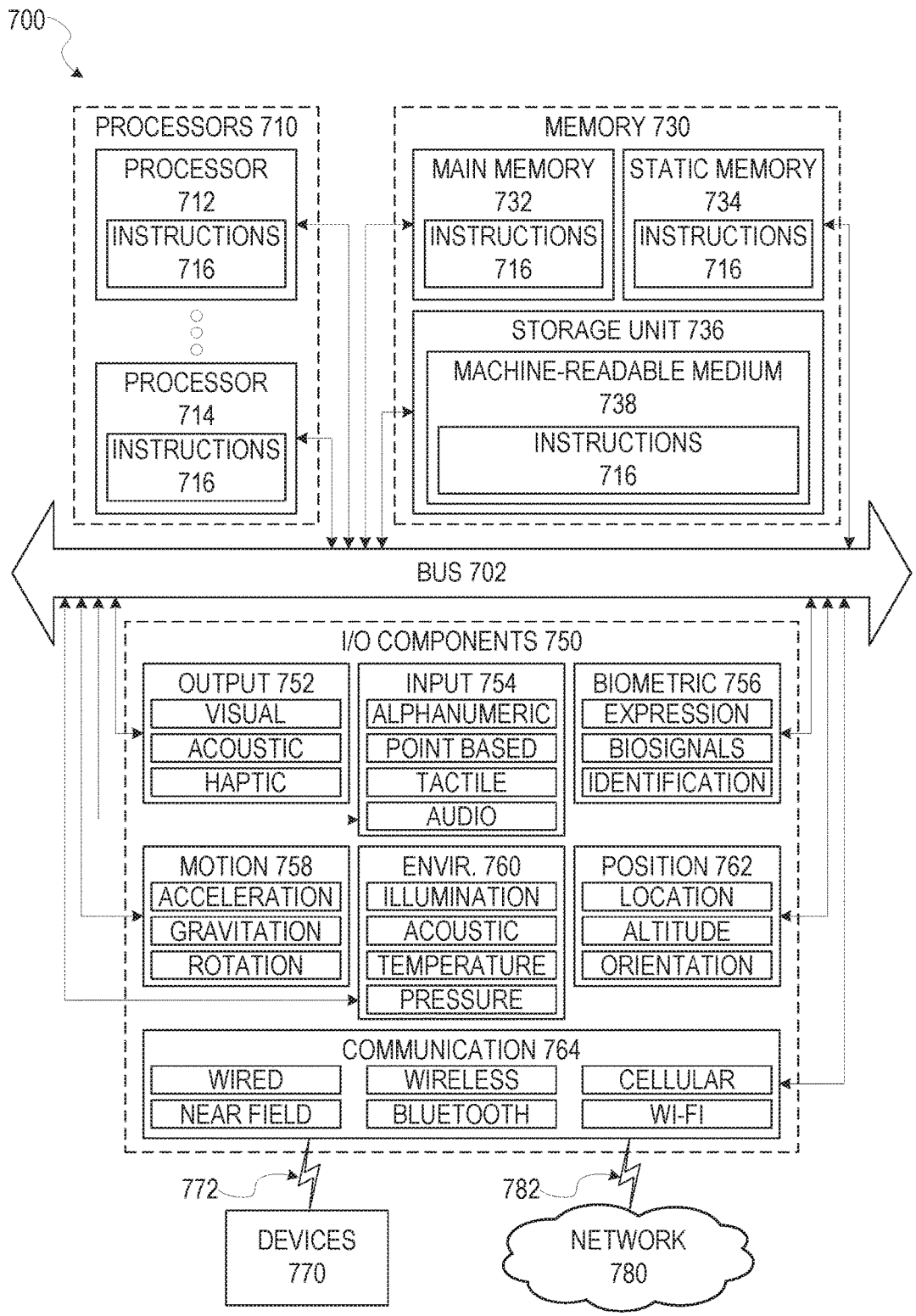
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 102, 120, 122, 124, and the like, or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement, the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method, comprising:
sending, via a network and using one or more hardware processors of a computing device associated with a first data owner, a request to register a data offer from the first data owner to participate in a distributed ledger stored in distributed computer memory, the request to register the data offer including information associated with the data offer and a privacy budget for the data offer, and wherein the information associated with the data offer and the privacy budget are stored in the distributed ledger and the data offer is accessible by third parties to the first data owner;
receiving, via the network, a first request from a first third party computer associated with a first third party, to access specified data associated with the data offer from the first data owner;
analyzing, using the one or more hardware processors, the privacy budget for the data offer to determine whether the privacy budget comprises a balance necessary to allow access to the specified data;

based on determining that the privacy budget comprises the balance necessary to allow access to the specified data, accessing the data offer, using the one or more hardware processors to produce result data comprising the specified data;

anonymizing, using the one or more hardware processors, the result data;

updating, using the one or more hardware processors, a distributed ledger entry in the distributed ledger to update a balance for the privacy budget;

providing, via the network, the anonymized result data to the first third party computer;

receiving a second request from a second third party computer associated with a second third party, to access second specified data associated with the data offer from the first data owner;

analyzing the privacy budget for the data offer to determine that the privacy budget does not comprise a balance necessary to allow access to the second specified data; and causing the data offer to be marked as invalid or expired in the distributed ledger.

2. The computerized method of claim 1, wherein the information associated with the data offer comprises identification information for the first data owner.

3. The computerized method of claim 1, wherein analyzing the privacy budget for the data offer to determine whether the privacy budget comprises a balance necessary to allow access to the specified data associated comprises:

determining a current balance of the privacy budget for the data offer;

determining how much privacy budget is necessary for the specified data; and comparing the privacy budget necessary for the specified data and the current balance of the privacy budget for the data offer.

4. The computerized method of claim 1, wherein the information associated with the data offer comprises a description of the data associated with the data offer.

5. The computerized method of claim 1, wherein receiving the first request from the first third party computer to access specified data associated with the data offer from the data owner comprises accessing the distributed ledger to determine that a request is made from the first third party.

6. The computerized method of claim 1, wherein the first request from the first third party computer to access specified data associated with the data offer comprises a privacy guarantee the first third party is willing to accept.

7. The computerized method of claim 1, wherein the first request from the first third party computer to access data associated with the data offer comprises a function the first third party is interested in.

8. The computerized method of claim 1, wherein anonymizing the result data comprises adding noise to the result data.

9. The computerized method of claim 8, wherein an amount of noise added is scaled according to a portion of the privacy budget that is available for the result data.

10. The computerized method of claim 1, further comprising:

receiving a third request from a third third party computer associated with a third third party, to access third specified data associated with the data offer from the data owner;

analyzing the privacy budget for the data offer to determine whether the budget comprises a balance necessary to allow access to the third specified data;

based on determining that the privacy budget comprises the balance necessary to allow access to the third specified data, accessing the data offer to produce third result data comprising the third specified data;

anonymizing the third result data;

updating a distributed ledger entry with an updated balance for the privacy budget; and providing the anonymized third result data to the second third party computer.

11. The computerized method of claim 1, wherein the distributed ledger comprises data offers from other data owners not associated with the first data owner.

12. The computerized method of claim 1, wherein analyzing the privacy budget for the data offer to determine that the privacy budget does not comprise a balance necessary to allow access to the second specified data comprises determining that the balance for the privacy budget is zero or insufficient for any further query.

13. A server computer associated with a first data owner comprising:

at least one processor; and a computer-readable medium coupled with the at least one processor, the computer-readable medium comprising instructions stored thereon that are executable by the at least one processor to cause the server computer to perform operations comprising:

sending a request to register a data offer from the first data owner to participate in a distributed ledger stored in distributed computer memory, the request to register the data offer including information associated with the data offer and a privacy budget for the data offer, and wherein the information associated with the data offer and the privacy budget are stored in the distributed ledger and the data offer is accessible by third parties to the first data owner;

receiving a first request from a first third party computer associated with a first third party, to access specified data associated with the data offer from the first data owner;

analyzing the privacy budget for the data offer to determine whether the privacy budget comprises a balance necessary to allow access to the specified data;

based on determining that the privacy budget comprises the balance necessary to allow access to the specified data, accessing the data offer to produce result data comprising the specified data;

anonymizing the result data;

updating a distributed ledger entry in the distributed ledger to update a balance for the privacy budget;

providing the anonymized result data to the first third party computer;

receiving a second request from a second third party computer associated with a second third party, to access second specified data associated with the data offer from the first data owner;

analyzing the privacy budget for the data offer to determine that the privacy budget does not comprise a balance necessary to allow access to the second specified data; and causing the data offer to be marked as invalid or expired in the distributed ledger.

14. The server computer of claim 13, wherein receiving the first request from the first third party computer to access data associated with the data offer from the first data owner comprises accessing the distributed ledger to determine that a request is made from the first third party.

15. The server computer of claim 13, wherein the first request from the first third party computer to access specified data associated with the data offer comprises a privacy guarantee the first third party is willing to accept.

16. The server computer of claim 13, wherein the first request from the first third party computer to access specified data associated with the data offer comprises a function the first third party is interested in.

17. The server computer of claim 13, wherein anonymizing the result data comprises adding noise to the result data.

18. The server computer of claim 17, wherein an amount of noise added is scaled according to a portion of the privacy budget that is available for the result data.

19. The server computer of claim 13, wherein the distributed ledger comprises data offers from other data owners not associated with the first data owner.

20. A non-transitory computer-readable medium comprising instructions stored thereon that are executable by at least one processor to cause a computing device associated with a first data owner to perform operations comprising:
sending a request to register a data offer from the first data owner to participate in a distributed ledger stored in distributed computer memory, the request to register the data offer including information associated with the data offer and a privacy budget for the data offer, and wherein the information associated with the data offer and the privacy budget are stored in the distributed ledger and the data offer is accessible by third parties to the first data owner;
receiving a first request from a first third party computer associated with a first third party, to access specified data associated with the data offer from the first data owner;
analyzing the privacy budget for the data offer to determine whether the privacy budget comprises a balance necessary to allow access to the specified data;
based on determining that the privacy budget comprises the balance necessary to allow access to the specified data, accessing the data offer to produce result data comprising the specified data;
anonymizing the result data;
updating a distributed ledger entry in the distributed ledger to update a balance for the privacy budget;
providing the anonymized result data to the first third party computer;
receiving a second request from a second third party computer associated with a second third party, to access second specified data associated with the data offer from the first data owner;
analyzing the privacy budget for the data offer to determine that the privacy budget does not comprise a balance necessary to allow access to the second specified data; and
causing the data offer to be marked as invalid or expired in the distributed ledger.

* * * * *